United States Patent [19]
Dygos

[11] 3,843,660
[45] Oct. 22, 1974

[54] 3-OXO-2-AZABICYCL [2,2,2] OCTAN-6-EXO-YL-5-(4-BIPHENYL)-3-METHYLVALERAIE AND CONGENERS

[75] Inventor: John H. Dygos, Northbrook, Ill.
[73] Assignee: G. D. Searle & Co., Chicago, Ill.
[22] Filed: July 21, 1972
[21] Appl. No.: 273,680

[52] U.S. Cl.... 260/293.54, 260/326.27, 260/239 B, 260/239.3 B, 260/468 R, 424/256, 424/263
[51] Int. Cl............................................. C07d 39/00
[58] Field of Search .................... 260/239 B, 293.54

[56] References Cited
UNITED STATES PATENTS
2,800,484   7/1957   Stoll et al........................ 260/293.54
3,120,551   2/1964   Goldschmidt ................... 260/455 R
3,502,669   3/1970   Nakanishi et al. .............. 260/293.54
3,673,195   6/1972   Yoneda et al. .................. 260/293.54
3,709,893   1/1973   Bernardi ......................... 260/293.54

OTHER PUBLICATIONS
Huffman et al., "Journal of Organic Chemistry," 9/27/1966, Vol. 32, pp. 700–703.

Primary Examiner—Donald G. Daus
Assistant Examiner—D. Wheeler
Attorney, Agent, or Firm—John M. Brown

[57] ABSTRACT
Disclosed herein are optionally-oxygenated azabicycloalkanyl ω-(4-biphenylyl)alkanoates and corresponding salts, means of preparing them, and their valuable biological properties, including antihypercholesterolemic, hypolipemic, and antiviral activity.

5 Claims, No Drawings

3-OXO-2-AZABICYCL [2,2,2] OCTAN-6-EXO-YL-5-(4-BIPHENYL)-3-METHYLVALERAIE AND CONGENERS

This invention relates to azabicyclic esters of ω-(4-biphenylyl)alkanoic acids and processes for the preparation thereof. More particularly, this invention provides new, useful, and unobvious chemical compounds of the formula

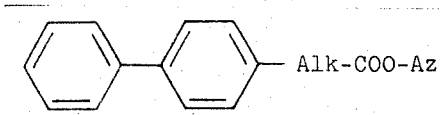

wherein Alk represents alkylene and Az represents the residue of an azabicycloalkanol containing 8–9 carbons.

Among the alkylenes represented by Alk, lower alkylenes are preferred, for example, methylene, ethylene, trimethylene, propylene, tetramethylene, 1,1-dimethylethylene, pentamethylene, 2,2-dimethyltrimethylene, and like bivalent, saturated, acyclic, straight- or branched-chain, hydrocarbon groupings having the formula $$-C_nH_{2n}-$$

wherein $n$ represents a positive integer less than 8. One of the best of the lower alkylenes, for present purposes, is 2-methyltetramethylene, the methyl substituent being either 2 or — preferably — 3 carbons removed from the biphenylyl grouping.

Preferred azabicycloalkanol residues represented by Az are optionally-oxygenated 2-azabicyclo[2.2.2]octan-6-yl, 6-azabicyclo[3.2.1]octan-4-yl, 2-azabicyclo[3.3.1]=nonan-8-yl, 3-azabicyclo[3.3.1]nonan-6-yl, and 3-azabicyclo=[3.2.2]nonan-6-yl, in each of which the nitrogen is substituted by a hydrocarbon radical unless it is amidic (i.e., situate next to a carbon substituted by oxygen), in which event the nitrogen can be unsubstituted. These preferred azabicycloalkanol residues can be enformulated, respectively, thus:

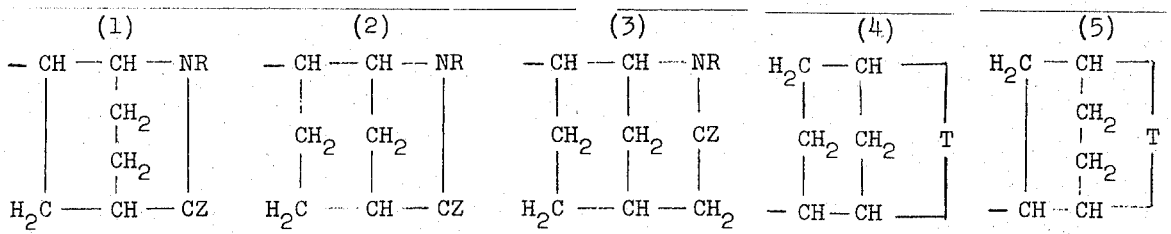

In the foregoing 5 formulas, R represents hydrogen, lower alkyl, phenethyl, benzyl, or phenyl; Z represents oxygen when R represents hydrogen, otherwise Z represents oxygen or 2 hydrogens; and T represents a radical of the formula

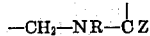

wherein R and Z are defined as above.

Those skilled in the art will recognize that lower alkyls include methyl, ethyl, propyl, isopropyl, butyl, isobutyl, sec.-butyl, tert.-butyl, pentyl, neo-pentyl, hexyl, isohexyl, heptyl, and like monovalent, saturated, acyclic, straight- or branched-chain hydrocarbon groupings of the formula $$-C_nH_{2n+1}$$

wherein $n$ is defined as before. The stereochemistry of the involved alkanol residues is deemed not to be critical, both endo and exo configurations being contemplated.

Equivalent to the foregoing compounds for the purposes of this invention are non-toxic acid addition and quaternary ammonium salts of the formula

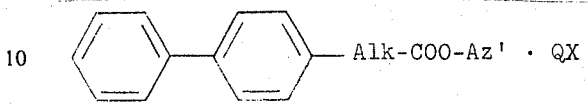

wherein Alk is defined as before; Az' is identical with Az as defined before except that the azabicycloalkanol residues represented are not oxygenated; Q represents hydrogen, lower alkyl, hydroxy(lower alkyl), lower alkenyl such as vinyl and allyl, or aralkyl such as benzyl and phenethyl; and X represents one equivalent of an anion — for example, chloride, bromide, iodide, nitrate, phosphate, sulfate, sulfamate, methyl sulfate, ethyl sulfate, benzenesulfonate, toluenesulfonate, acetate, lactate, glycolate, succinate, malate, maleate, tartrate, citrate, gluconate, ascorbate, benzoate, cinnamate, or the like — which, in combination with the cationic portion of a salt aforesaid, is neither biologically nor otherwise undesirable.

The compounds to which this invention relates are useful by reason of their valuable biological properties. Thus, for example, they are antihypercholesterolemic and hypolipemic. They are also antiviral in respect of neurotropic viruses, for example, arboviruses such as Semliki Forest virus.

The antihypercholesterolemic utility of the instant compounds can be demonstrated by the test for this property described in U.S. Pat. No. 3,462,466. The product of Example 2B hereinafter was found to be antihypercholesterolemic at 20 mg. per kg. orally in this test.

The hypolipemic utility of the instant compounds can be demonstrated by the following standardized test for their capacity to lower serum triglycerides in rats. Charles River rats weighing 180–220 gm. apiece and maintained on tap water (ad libitum) without food for 24 hr. are used. To each of a group (Group I) of 8 such animals is initially administered, intragastrically, 100 mg. per kg. of compound dissolved or suspended in distilled water at a concentration of 25 mg. per ml. Serum triglycerides are determined 4 hr. later by the procedure of L. A. Carlson in J. Atherosclerosis Res., 3, 334 (1963). Controls are provided by second and third groups (Groups II and III) of 8 animals each concurrently and identically treated excepting that in Group II compound is omitted from the distilled water administered, and in Group III 100 mg. per kg. of nicotinic acid is substituted for compound. The test is considered valid if the median mg. percent serum triglyceride value is significantly lower for Group III than for Group II (Cf. Carlson et al., Acta Med. Scand., 179, 453 (1966).); and a compound is considered hypolipemic if, at a dose of 100 mg. per kg. or less in a valid test, the median mg. percent serum triglyceride value for Group I is significantly lower than for Group II. The level of significance in each instance is P < 0.05 as determined by the Wilcoxan Rank Sum method. The product of Example 5C hereinafter was found to be hypolipemic at 40 mg. per kg.

The hypolipemic utility of the instant compounds can also be demonstrated by the following standardized test for their capacity to lower both serum cholesterol and serum triglycerides in rats. Charles River CD rats weighing 400–450 gm. apiece and maintained on tap water ad libitum are used in this test. To each of a group (Group I) of 8 such animals is administered in the powdered diet 0.2 percent of compound. The compound is incorporated by dissolving it in acetone or other volatile solvent and mixing the solution with the diet, whereupon the solvent is allowed to evaporate at room temperatures. The animals are fed the treated diet for 5 days. On the 6th day serum samples are obtained and are analyzed for cholesterol and triglycerides. Cholesterol is analyzed by the method of Block et al., Automation in Analytical Chemistry, Technicon Symposium, 1965, Mediad Incorporated, White Plains, N.Y. 10601, pp. 345 ff.; and the triglycerides are assayed by the procedure of Noble and Campbell, Clin. Chem., 16, 166 (1970). Controls are provided by a second group (Group II) of 8 animals each concurrently and identically treated except that in Group II the compound is omitted from the diet. A compound is considered hypolipemic if the mean mg. percent serum cholesterol and triglyceride values for Group I are significantly lower than for Group II. The level of significance in each instance is P < 0.05 as determined by the Wilcoxon Rank Sum method.

The antiviral utility of the instant compounds can be demonstrated by administering compound every day for 2 weeks to mice, then infecting them by injecting 200 times the $LD_{50}$ of Semliki Forest virus, and thereupon resuming administration of compound on a daily basis until the mean survival time can be compared with that of concurrent controls to which virus but no compound is administered. The product of Example 2B hereinafter effected a 32 percent prolongation of survival time at 80 mg. per kg. IP in this test.

Those skilled in the art will recognize that observations of activity in standardized tests for particular biological effects are fundamental to the development of valuable new drugs, both veterinary and human.

Preparation of the basic esters of this invention, (as distinguished from those wherein the nitrogen is amidic) proceeds by contacting an alkanol of the formula Az'OH with sodium hydride in benzene under nitrogen, then contacting the resultant sodium alkoxide in situ with one equivalent of an acid chloride having the formula

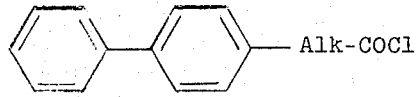

Az' and Alk in the latter two formulas being defined as before. Each basic ester, upon simple admixture with one equivalent of any inorganic or strong organic acid wherein the anionic component is defined by X hereinbefore, affords a corresponding acid addition salt of the invention. Alternatively, such ester is converted to a quaternary ammonium salt hereof by contacting with at least one equivalent of an ester of the formula

Q'X wherein the definition of Q' is identical with that of Q above excepting that Q' does not represent hydrogen, and the definition of X remains as before. Quaternization is ordinarily carried out at 25°–100° C. in ether, chloroform, acetone, methanol, or the like, and is completed in from 1 to 48 hours. A closed system is used if Q'X is a gas at operating temperatures.

Preparation of the amidic esters of this invention proceeds by contacting, in the presence of pyridine and using benzene as a solvent, an alcohol of the formula Az"OH with an acid chloride of the formula

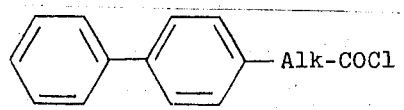

Az" being identical with Az as defined hereinbefore except that the azabicycloalkanol residues represented are oxygenated and Alk being defined as before.

The folowing examples describe in detail compounds illustrative of the present invention and methods for their preparation. Throughout the examples hereinafter set forth, temperatures are given in degrees centigrade, and relative amounts of materials in parts by weight except as otherwise noted.

EXAMPLE 1

A. 5-(4-Biphenylyl)-3-methylvaleryl chloride.

A solution of 20 parts of 5-(4-biphenylyl)-3-methylvaleric acid in approximately 130 parts of thionyl chloride is allowed to stand at room temperatures for 5 hours. Excess thionyl chloride is thereupon distilled off in vacuo, the last traces being removed azeotropically by adding and distilling off benzene. The oily residue is 5-(4-biphenylyl)-3-methylvaleryl chloride.

B. 3-Oxo-2-azabicyclo[2.2.2]octan-6-exo-yl 5-(4-biphenylyl)-3-methylvalerate.

To a solution of approximately 21 parts of 5-(4-biphenylyl)-3-methylvaleryl chloride in 540 parts of benzene is added approximately 11 parts of 6-exo-hydroxy-2-azabicyclo[2.2.2]octan-3-one (prepared by Huffman et al., J. Org. Chem., 32, 700 (1967), as 3-oxo-6-endo-hydroxy-2-azabicyclo[2.2.2]octane), followed by 10 parts of pyridine. The resultant mixture is heated at the boiling point under reflux for 18 hours, cooled to room temperature, and then stripped of solvent by vacuum distillation. The residue is dissolved in benzene; and the benzene solution is chromatographed on silica gel, using benzene and mixtures thereof with increasing amounts of ethyl acetate as developing solvents. From eluates comprising 20 and 50 percent ethyl acetate in benzene, combined and stripped of solvent by vacuum distillation, there is obtained as the residue 3-oxo-2-azabicyclo[2.2.2]octan-6-exo-yl 5-(4-biphenylyl)-3-methylvalerate which, recrystallized from a mixture of ethyl acetate and hexane, is a colorless solid melting at approximately 137°–138°. The product has the formula

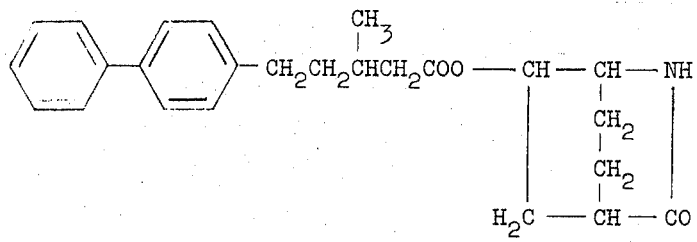

The product can also be depicted as

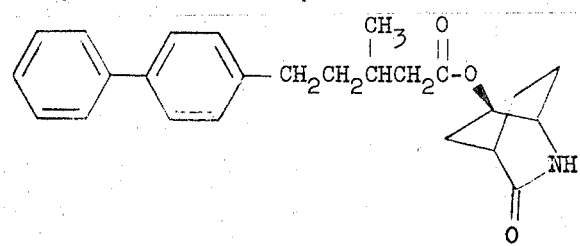

EXAMPLE 2

A. 6-exo-Hydroxy-2-methyl-2-azabicyclo[2.2.2]octan-3-one.

Gaseous methylamine is bubbled through a solution of 16 parts of the compound named and prepared by Huffman et al., loc. cit., as 3-carbomethoxy-7-oxabicyclo[4.1.0]heptane in 32 parts of methanol at room temperatures until thin layer chromatography indicates the complete disappearance of the bicyclo starting material. Solvent is thereupon removed by vacuum distillation; and the residue is heated at 150° for 2 hours, then at 190° for 1 hour, leaving a brown gum. The gum is dissolved in a mixture of 40 parts of methanol and 50 parts of aqueous 10 percent sodium hydroxide, and this solution is heated at the boiling point under reflux for 1 hr. Methanol is removed by vacuum distillation, and the aqueous residue is extracted with dichloromethane. The resultant extract is washed with water, dried over magnesium sulfate, and filtered. Solvent is again removed by vacuum distillation and the residue is crystallized from ethyl acetate to give colorless 6-exo-hydroxy-2-methyl-2-azabicyclo[2.2.2]octan-3-one melting at 110°–112°.

B. 2-Methyl-3-oxo-2-azabicyclo[2.2.2]octan-6-exo-yl 5-(4-biphenylyl)-3-methylvalerate.

To a solution of approximately 21 parts of 5-(4-biphenylyl)-3-methylvaleryl chloride in 540 parts of benzene is added approximately 12 parts of 6-exo-hydroxy-2-methyl-2-azabicyclo[2.2.2]octan-3-one, followed by 10 parts of pyridine. The resultant mixture is stirred at room temperatures for 19 hours, whereupon it is consecutively washed with 5 percent hydrochloric acid, aqueous 5 percent potassium carbonate, and saturated aqueous sodium chloride, then dried over magnesium sulfate and finally filtered. The filtrate is stripped of solvent by vacuum distillation, leaving a yellow oil. The yellow oil is extracted with boiling hexane; and the hexane extract is stripped of solvent by vacuum distillation, leaving a pale yellow oil. Extraction again with boiling hexane and stripping of solvent affords a colorless oil which is crystallized from a mixture of hexane and benzene to give 2-methyl-3-oxo-2-azabicyclo[2.2.2]octan-6-exo-yl 5-(4-biphenylyl)-3-methylvalerate melting at 74°–75.5°.

EXAMPLE 3

A. 6-exo-Hydroxy-2-isopropyl-2-azabicyclo[2.2.2]octan-3-one.

A solution of 160 parts of 3-carbomethoxy-7-oxabicyclo[4.1.0]heptane and 46 parts of isopropylamine in 320 parts of methanol is stirred at room temperatures until thin layer chromatography indicates disappearance of the bicyclo starting material. Methanol is then removed by vacuum distillation; and the residue is heated at 150° for 2 hours, then at 190° for 1 hour, leaving a gummy residue. This residue is taken up in a mixture of 40 parts of methanol and 50 parts of aqueous 10 percent sodium hydroxide, and the resultant solution is heated at the boiling point under reflux for 1 hour. Methanol is thereupon removed by vacuum distillation, and the aqueous residue is extracted with dichloromethane. The dichloromethane extract is washed with water, dried over magnesium sulfate, and filtered. Upon removal of solvent from the filtrate by vacuum distillation, there remains as the residue 6-exo-hydroxy-2-isopropyl-2-azabicyclo[2.2.2]octan-3-one.

B. 2-Isopropyl-3-oxo-2-azabicyclo[2.2.2]octan-6-exo-yl 5-(4-biphenylyl)-3-methylvalerate.

Substitution of approximately 14 parts of 6-exo-hydroxy-2-isopropyl-2-azabicyclo[2.2.2]octan-3-one for the 11 parts of 6-exo-hydroxy-2-azabicyclo[2.2.2]octan-3-one called for in Example 1B affords, by the procedure there detailed, 2-isopropyl-3-oxo-2-azabicyclo[2.2.2]octan-6-exo-yl 5-(4-biphenylyl)-3-methylvalerate.

EXAMPLE 4

2-Benzyl-3-oxo-2-azabicyclo[2.2.2]octan-6-exo-yl 5-(4-biphenylyl)-3-methylvalerate.

Substitution of approximately 16 parts of 2-benzyl-6-exo-hydroxy-2-azabicyclo[2.2.2]octan-3-one (prepared by Huffman et al., loc. cit., as 2-benzyl-3-oxo-6-endo-hydroxy-2-azabicyclo[2.2.2]octane) for the 12 parts of 6-exo-hydroxy-2-methyl-2-azabicyclo[2.2.2]octan-3-one called for in Example 2B affords, by the procedure there detailed, 2-benzyl-3-oxo-2-azabicyclo[2.2.2]octan-6-exo-yl 5-(4-biphenylyl)-3-methylvalerate melting at approximately 72.5°–73.5°.

EXAMPLE 5

A. 2-Methyl-2-azabicyclo[2.2.2]octan-6-exo-ol.

A suspension of 8 parts of lithium aluminum hydride in 450 parts of tetrahydrofuran is stirred and heated at the boiling point under reflux while a solution of 10 parts of 6-exo-hydroxy-2-methyl-2-azabicyclo[2.2.2]octan-3-one in 450 parts of tetrahydrofuran is very slowly added. After the addition is complete, stirring and heating is continued for 5 days, whereupon the reaction mixture is cooled and diluted with 300 parts of ether, at which point a mixture of 32 parts of water and 180 parts of tetrahydrofuran is slowly introduced. The resultant mixture is stirred overnight and filtered. The insoluble solids thus removed are washed with hot tetrahydrofuran. Filtrate and washings are combined and stripped of solvent by vacuum distillation. The residue is distilled in vacuo to give, in the fraction boiling at 75°–78° under 0.40 mm. pressure, 2-methyl-2-azabicyclo[2.2.2]octan-6-exo-ol.

B. 2-Methyl-2-azabicyclo[2.2.2]octan-6-exo-yl 5-(4-biphenylyl)-3-methylvalerate.

A solution of approximately 21 parts of 2-methyl-2-azabicyclo[2.2.2]octan-6-exo-ol in 180 parts of benzene is slowly added, in a nitrogen atmosphere, to a stirred suspension of 12 parts of a 60 percent sodium hydride-mineral oil dispersion in 90 parts of benzene. When the addition is complete, stirring is continued for 8 hours, at which point a solution of approximately 43 parts of 5-(4-biphenylyl)-3-methylvaleryl chloride in 225 parts of benzene is introduced. Stirring is further continued for 2 ½ hours thereafter (the nitrogen atmosphere being maintained throughout), whereupon the reaction mixture is partitioned between water and ether. The ether phase is separated, washed with aqueous 5 percent potassium carbonate, dried over magnesium sulfate, and filtered. Solvent is stripped from the filtrate by vacuum distillation, leaving a yellow oil which is 2-methyl-2-azabicyclo[2.2.2]octan-6-exo-yl 5-(4-biphenylyl)-3-methylvalerate.

C. 2-Methyl-2-azabicyclo[2.2.2]octan-6-exo-yl 5-(4-biphenylyl)-3-methylvalerate methiodide.

To a solution of 5 parts of 2-methyl-2-azabicyclo[2.2.2]octan-6-exo-yl 5-(4-biphenylyl)-3-methylvalerate in 140 parts of ether is added 3 parts of methyl iodide. The resultant mixture is stirred for 2 days, whereupon insoluble solids are filtered out, washed with ether, dissolved in 25 parts of ethanol, and reprecipitated by pouring the ethanol solution into 350 parts of hexane. The mixture thus obtained is stirred for 10 minutes, then the precipitate is filtered off and dried in vacuo to give 2-methyl-2-azabicyclo[2.2.2]octan-6-exo-yl 5-(4-biphenylyl)-3-methylvalerate methiodide melting at 187–189°.

EXAMPLE 6

A. 2-Isopropyl-2-azabicyclo[2.2.2]octan-6-exo-ol.

Substitution of approximately 12 parts of 6-exo-hydroxy-2-isopropyl-2-azabicyclo[2.2.2]octan-3-one for the 10 parts of 6-exo-hydroxy-2-methyl-2-azabicyclo[2.2.2]octan-3-one called for in Example 5A affords, by the procedure there detailed, 2-isopropyl-2-azabicyclo[2.2.2]octan-6-exo-ol.

B. 2-Isopropyl-2-azabicyclo[2.2.2]octan-6-exo-yl 5-(4-biphenylyl)-3-methylvalerate.

Substitution of approximately 25 parts of 2-isopropyl-2-azabicyclo[2.2.2]octan-6-exo-ol for the 21 parts of 2-methyl-2-azabicyclo[2.2.2]octan-6-exo-ol called for in Example 5B affords, by the procedure there detailed, 2-isopropyl-2-azabicyclo[2.2.2]octan-6-exo-yl 5-(4-biphenylyl)-3-methylvalerate.

EXAMPLE 7

2-Methyl-2-azabicyclo[2.2.2]octan-6-endo-yl 5-(4-biphenylyl)-3-methylvalerate.

Substitution of approximately 21 parts of 2-methyl-2-azabicyclo[2.2.2]octan-6-endo-ol (prepared by Gassman and Dygos, Tetrahedron Letters, 1970, 4745 and identified as compound 14) for the 21 parts of 2-methyl-2-azabicyclo[2.2.2]octan-6-exo-ol called for in Example 6B affords, by the procedure there detailed, 2-methyl-2-azabicyclo[2.2.2]octan-6-endo-yl 5-(4-biphenylyl)-3-methylvalerate. The product is a stereoisomer of the product of Example 5B and can be depicted thus

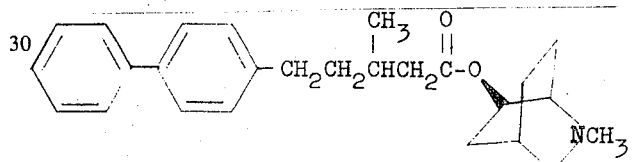

EXAMPLE 8

6-Benzyl-7-oxo-6-azabicyclo[3.2.1]octan-4-exo-yl 5-(4-biphenyl)-3-methylvalerate.

Substitution of 16 parts of 6-benzyl-4-exo-hydroxy-6-azabicyclo[3.2.1]octan-7-one (prepared by Huffman et al., loc. cit., as 2-benzyl-3-oxo-7-endo-hydroxy-2-azabicyclo[3.2.1]octane) for the 11 parts of 6-exo-hydroxy-2-azabicyclo[2.2.2]octan-3-one called for in Example 1B affords, by the procedure there detailed, 6-benzyl-7-oxo-6-azabicyclo[3.2.1]octan-4-exo-yl 5-(4-biphenylyl)-3-methylvalerate, having the formula

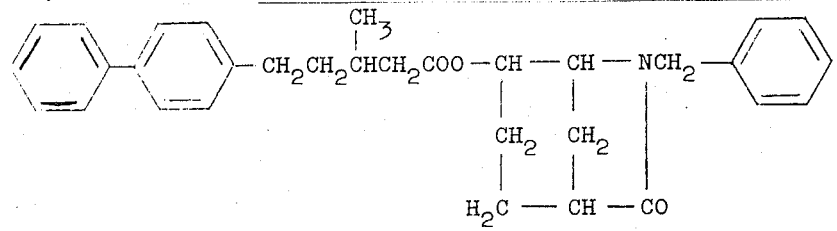

The product can also be depicted as

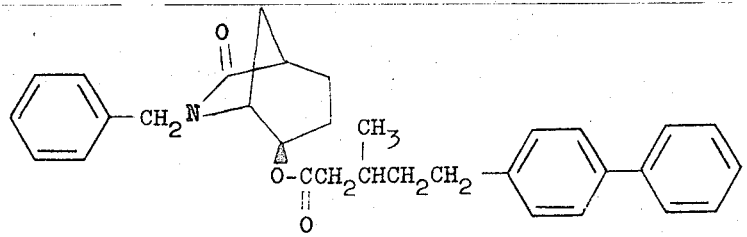

EXAMPLE 9

6-Methyl-6-azabicyclo[3.2.1]octan-4-exo-yl 5-(4-biphenylyl)-3-methylvalerate.

Substitution of 21 parts of 6-methyl-6-azabicyclo[3.2.1]octan-4-exo-ol (prepared by Gassman and Dygos, loc. cit., and identified as compound 7) for the 21 parts of 2-methyl-2-azabicyclo[2.2.2]octan-6-exo-ol called for in Example 5B affords, by the procedure there detailed, 6-methyl-6-azabicyclo[3.2.1]octan-4-exo-yl 5-(4-biphenylyl)-3-methylvalerate having the formula

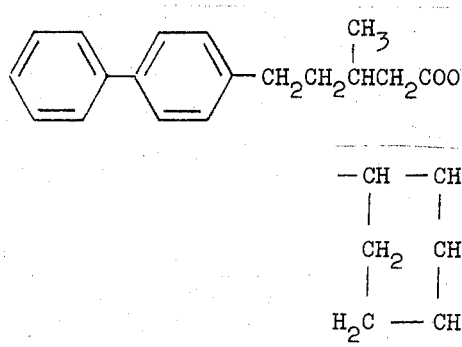

The product can also be depicted as

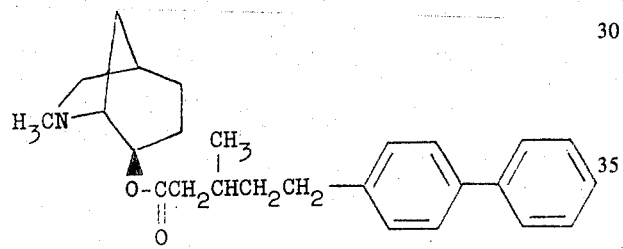

EXAMPLE 10

6-Methyl-6-azabicyclo[3.2.1]octan-4-endo-yl 5-(4-biphenylyl)-3-methylvalerate.

Substitution of 21 parts of 6-methyl-6-azabicyclo[3.2.1]octan-4-endo-ol (prepared by Gassman and Dygos, loc. cit., and identified as compound 12) for the 21 parts of 2-methyl-2-azabicyclo[2.2.2]octan-6-exo-ol called for in Example 5B affords, by the procedure there detailed, 6-methyl-6-azabicyclo[3.2.1]octan-4-endo-yl 5-(4-biphenylyl)-3-methylvalerate. The product is a stereoisomer of the product of Example 9 and can be depicted thus

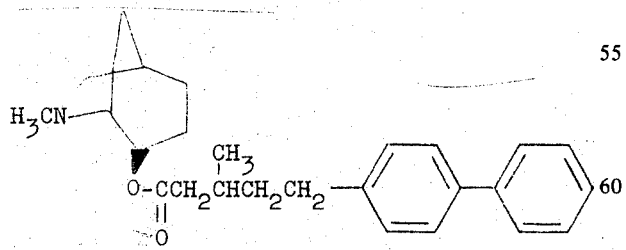

EXAMPLE 11

2-Methyl-2-azabicyclo[3.3.1]nonan-8-exo-yl 5-(4-biphenylyl)-3-methylvalerate.

Substitution of 23 parts of 2-methyl-2-azabicyclo[3.3.1]nonan-8-exo-ol (prepared by Gassman and Dygos, Tetrahedron Letters, 1970, 4749 and identified as compound 16) for the 21 parts of 2-methyl-2-azabicyclo[2.2.2]octan-6-exo-ol called for in Example 5B affords, by the procedure there detailed, 2-methyl-2-azabicyclo[3.3.1]nonan-8-exo-yl 5-(4-biphenylyl)-3-methylvalerate having the formula

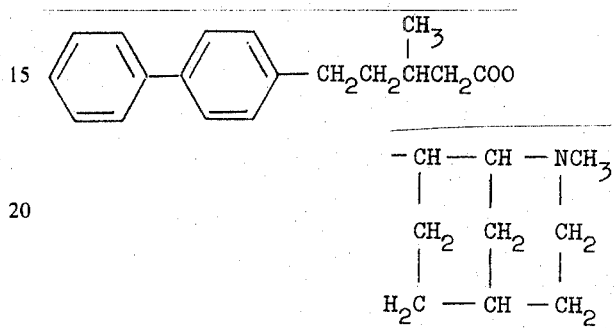

The product can also be depicted as

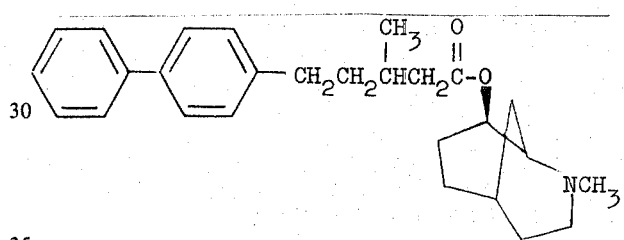

EXAMPLE 12

3-Benzyl-3-azabicyclo[3.3.1]nonan-6-exo-yl 5-(4-biphenylyl)-3-methylvalerate.

Substitution of 35 parts of 3-benzyl-3-azabicyclo[3.3.1]nonan-6-exo-ol (prepared by Johnson et al., J. Org. Chem., 33, 3195 (1968) as 3-benzyl-3-endo-azabicyclo[3.3.1]nonan-6-ol) for the 21 parts of 2-methyl-2-azabicyclo[2.2.2]octan-6-exo-ol called for in Example 5B affords, by the procedure there detailed, 3-benzyl-3azabicyclo[3.3.1]nonan-6-exo-yl 5-(4-biphenylyl)-3-methylvalerate having the formula

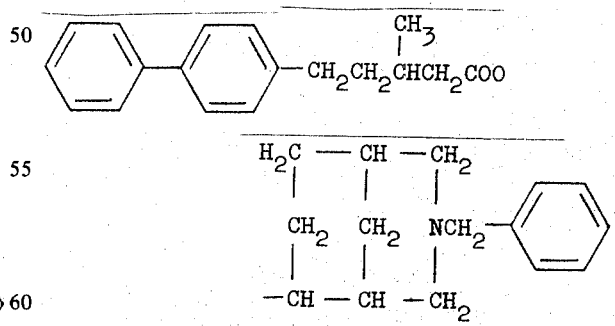

The product can also be depicted as

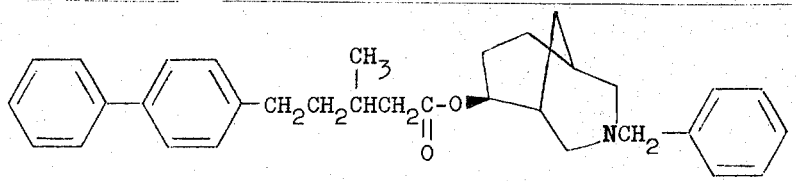

EXAMPLE 13

3-Benzyl-3-azabicyclo[3.2.2]nonan-6-endo-yl 5-(4-biphenylyl)-3-methylvalerate.

Substitution of 35 parts of 3-benzyl-3-azabicyclo[3.2.2]nonan-6-endo-ol (prepared by Johnson et al., loc. cit., as 3-benzyl-exo-3-azabicyclo[3.2.2]nonan-6-ol) for the 21 parts of 2-methyl-2-azabicyclo[2.2.2]octan-6-exo-ol called for in Example 5B affords, by the procedure there detailed, 3-benzyl-3-azabicyclo[3.2.2]nonan-6-endo-yl 5-(4-biphenylyl)-3-methylvalerate having the formula

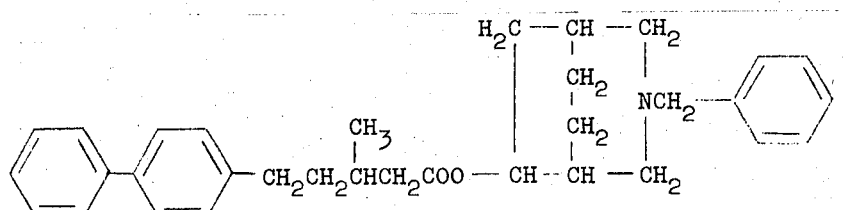

The product can also be depicted as

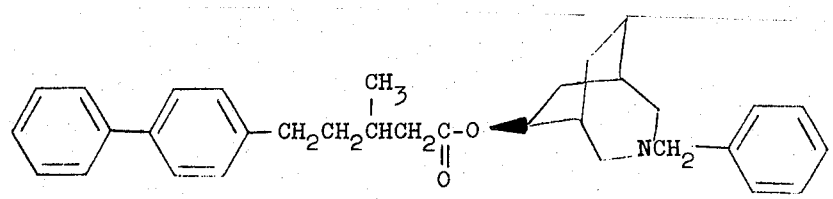

What is claimed is:

1. A compound of the formula

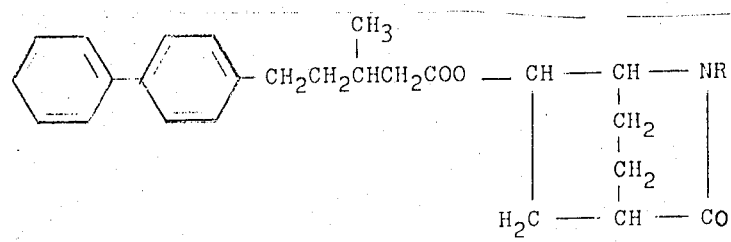

wherein R represents hydrogen, alkyl having fewer than 8 carbons, or benzyl.

2. The compound according to claim 1 which is 3-oxo-2-azabicyclo[2.2.2]octan-6-exo-yl 5-(4-biphenylyl)-3-methylvalerate.

3. The compound according to claim 1 which is 2-methyl-3-oxo-2-azabicyclo[2.2.2]octan-6-exo-yl 5-(4-biphenylyl)-3-methylvalerate.

4. A compound according to claim 1 which is 2-alkyl-3-oxo-2-azabicyclo[2.2.2]octan-6-exo-yl 5-(4-biphenylyl)-3-methylvalerate wherein the 2-alkyl has 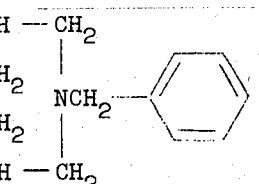 fewer than 8 carbons.

5. The compound according to claim 1 which is 2-benzyl-3-oxo-2-azabicyclo[2.2.2]octan-6-exo-yl 5-(4-biphenylyl)-3-methylvalerate.

* * * * *

UNITED STATES PATENT OFFICE
CERTIFICATE OF CORRECTION

Patent No. 3843660  Dated Oct. 22, 1974

Inventor(s) John H. Dygos

It is certified that error appears in the above-identified patent and that said Letters Patent are hereby corrected as shown below:

Title, "Methylvaleraie" should be -- Methylvalerates --.

Column 8, line 24, "6B" should be -- 5B --.

Column 10, line 47, "3azabicyclo" should be -- 3-azabicyclo --.

Signed and Sealed this sixteenth Day of December 1975

[SEAL]

Attest:

RUTH C. MASON
Attesting Officer

C. MARSHALL DANN
Commissioner of Patents and Trademarks